United States Patent
Brown et al.

(10) Patent No.: US 7,620,362 B2
(45) Date of Patent: *Nov. 17, 2009

(54) CONTROLLING ACCESS TO WIRELESSLY BROADCAST ELECTRONIC WORKS DURING PLAYBACK

(75) Inventors: Michael Wayne Brown, Georgetown, TX (US); Michael A. Paolini, Austin, TX (US); Newton James Smith, Jr., Austin, TX (US); Cornell G. Wright, Jr., Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 884 days.

This patent is subject to a terminal disclaimer.

(21) Appl. No.: 10/728,163

(22) Filed: Dec. 4, 2003

(65) Prior Publication Data

US 2005/0125221 A1   Jun. 9, 2005

(51) Int. Cl.
*H04H 1/00* (2006.01)

(52) U.S. Cl. .................. 455/3.03; 455/414.2; 455/434; 455/456.3

(58) Field of Classification Search .............. 455/414.1, 455/3.06, 3.04, 403, 41.3, 556.1, 575.9, 550.1, 455/414.2, 406, 411, 412.1, 404, 432.1, 3.01, 455/3.03, 434, 456.1–456.3, 3.05, 421, 452.1; 705/14, 59; 709/231, 217; 704/200.1, 270; 725/32
See application file for complete search history.

(56) References Cited

U.S. PATENT DOCUMENTS

| | | | | |
|---|---|---|---|---|
| 5,247,293 | A | 9/1993 | Nakagawa | 340/825.25 |
| 6,356,934 | B1 * | 3/2002 | Delph | 709/204 |
| 7,027,832 | B2 | 4/2006 | Gum | |
| 7,203,456 | B1 * | 4/2007 | Beard et al. | 455/3.01 |
| 2002/0040255 | A1 | 4/2002 | Neoh | 700/94 |
| 2002/0067805 | A1 * | 6/2002 | Andrews | 379/67.1 |
| 2002/0074413 | A1 | 6/2002 | Henzerling | 235/492 |
| 2002/0132585 | A1 | 9/2002 | Palermo et al. | 455/41 |
| 2002/0168938 | A1 | 11/2002 | Chang | 455/41 |
| 2002/0184038 | A1 * | 12/2002 | Costello et al. | 704/500 |
| 2003/0002849 | A1 | 1/2003 | Lord | 386/46 |
| 2003/0024375 | A1 | 2/2003 | Sitrick | 84/477 |
| 2003/0073432 | A1 | 4/2003 | Meade, II | 455/420 |
| 2003/0073460 | A1 | 4/2003 | van Pelt et al. | 455/556 |
| 2003/0083013 | A1 | 5/2003 | Mowery et al. | 455/41 |
| 2003/0108164 | A1 | 6/2003 | Laurin et al. | 379/88.01 |

(Continued)

FOREIGN PATENT DOCUMENTS

CN   1371056 A   9/2002

(Continued)

*Primary Examiner*—John Lee
(74) *Attorney, Agent, or Firm*—David A. Mims, Jr.; Amy J. Pattillo (57) ABSTRACT

A wireless broadcast of an electronic work with digital rights rules is received from a primary player at a secondary player. Synchronous play of the electronic work at the secondary player is enabled while the secondary player is within reception range of the primary player. A sample of the streamed electronic work with digital rights rules is stored at the secondary player. Responsive to detecting that the secondary player has moved outside reception range of the primary player, the secondary player only allows playback of the stored electronic work according to the digital rights rules.

11 Claims, 8 Drawing Sheets

U.S. PATENT DOCUMENTS

| | | |
|---|---|---|
| 2004/0058662 A1 | 3/2004 | Gieske et al. |
| 2004/0153767 A1 | 8/2004 | Dolgonos |
| 2004/0248603 A1 | 12/2004 | Canoy |
| 2005/0004873 A1* | 1/2005 | Pou et al. .................. 705/51 |
| 2005/0086683 A1* | 4/2005 | Meyerson .................. 725/30 |
| 2005/0125222 A1 | 6/2005 | Brown et al. |
| 2005/0125302 A1 | 6/2005 | Brown et al. |
| 2006/0053080 A1* | 3/2006 | Edmonson et al. ............ 705/59 |
| 2007/0178830 A1* | 8/2007 | Janik et al. ................ 455/3.06 |

FOREIGN PATENT DOCUMENTS

| | | |
|---|---|---|
| JP | 09-160899 | 6/1997 |
| JP | 2001-344369 | 12/2001 |
| JP | 2002-133062 | 5/2002 |
| JP | 2002-203070 | 7/2002 |
| JP | 2002-259605 | 9/2002 |
| JP | 2002-262227 | 9/2002 |
| JP | 2003-198544 | 7/2003 |
| JP | 2003-228657 | 8/2004 |
| JP | 2005-514703 | 5/2005 |

* cited by examiner

CONTROLLING ACCESS TO WIRELESSLY BROADCAST ELECTRONIC WORKS DURING PLAYBACK

CROSS-REFERENCE TO RELATED APPLICATIONS

The present application is related to the following co-pending applications:
(1) U.S. patent application Ser. No. 10/728,164; and
(2) U.S. patent application Ser. No. 10/728,161.

BACKGROUND OF THE INVENTION

1. Technical Field

The present invention relates in general to improved playback systems and in particular to an improved method for controlling playback of electronic works. Still more particularly, the present invention relates to controlling access to wirelessly broadcast licensed electronic works during playback, such that an electronic work sampled from another electronic device is only played back on the receiving device according to the digital rights management (DRM) rules of the sampled electronic work.

2. Description of the Related Art

Technological advancement and copyright law are often in conflict with one another. Technology advances to provide newer and better devices that enable display and audio output of copyrightable works in an electronic form. These electronic works include, but are not limited to, music, film, video, and books. The technological advances, for example, continue to expand the types of electronic devices that play music. Further, technological advances are providing new ways of encapsulating music and new ways of distributing music, often without consideration of the rights of copyright holders. In contrast, copyright law continues to increase the protection that copyright holders have over copyrighted works, however enforcement of such rights is often difficult and costly. Thus, there is a need for technological developments that enforce and implement copyright protection and provide incentives for listeners and viewers of copyrighted music and other electronic works to attain proper licensing.

In particular, one of the advances in devices that play electronic works is in portable electronic devices that play music from MPEG-1 Layer 3 (MP3) and other types of electronic compression file formats. MP3 files are typically small in memory size and thus are ideal for storage and play on portable electronic devices. Further, MP3 and other types of electronic formats of licensed works are often easily transferable from one device to another via a wire or wireless network.

Advances in devices that play electronic works may also allow music files may to be streamed from one portable device to another, creating a type of ad-hoc radio system. While transfer of music files and streaming audio from one player to another is advantageous for consumers of portable player devices, it is often not advantageous for copyright holders. Therefore, for copyright holders, it would be advantageous to provide a method, system, and program for controlling access to streamed electronic works during playback at another portable electronic device. In particular, it would be advantageous to assign digital rights management (DRM) rules to wirelessly streamed electronic works, such that access to the electronic work during playback is controlled by the DRM rules. However, for consumers, it would also be advantageous to allow both synchronous playback of broadcast electronic works and storage of broadcast electronic works for later playback according to DRM rules.

SUMMARY OF THE INVENTION

In view of the foregoing, it is therefore an object of the present invention provides improved broadcasting systems. In addition, the invention provides method, for controlling playback of electronic works. Further, the invention provides a method, for controlling access to wirelessly broadcast licensed electronic works during playback, such that an electronic work sampled from another electronic device is only played back on the receiving device according to the DRM rules of the sampled electronic work.

According to one aspect of the invention, a wireless broadcast of an electronic work with digital rights rules is received from a primary player at a secondary player. Synchronous play of the electronic work at the secondary player is enabled while the secondary player is within reception range of the primary player. A sample of the streamed electronic work with digital rights rules is stored at the secondary player. Responsive to detecting that the secondary player has moved outside reception range of the primary player, only playback of the stored electronic work according to the digital rights rules is allowed.

When a user loads an electronic work on the primary player, the electronic work includes DRM rules that specify whether a wireless broadcast of the electronic work is allowed. Further, reception and transmission ranges and transfer mediums for a broadcast of the electronic work are specified in the DRM rules. Further, where broadcast of an electronic work is allowed, the DRM rules specify what type of sample of the electronic work is broadcast and stored at the secondary player.

In one embodiment of the invention, the primary player and secondary player are both portable players enabled to move from one location to another.

According to the invention, multiple secondary players receive the broadcast of the electronic work. Further, the multiple secondary players transmit preferences to the primary player, wherein the primary player uses the preferences of the users of the secondary players to select which electronic work to next broadcast.

According to the invention, users at secondary players respond to playback of electronic works by rating the electronic works and writing comments about the electronic works. The ratings and comments is stored at the secondary players, distributed among the secondary players and primary player, and distributed to a network server enabled to collect ratings of electronic works.

A wireless broadcast of an electronic work with digital rights rules is received from a primary player at a secondary player. Synchronous play of the electronic work at the secondary player is enabled while the secondary player is within reception range of the primary player. A sample of the streamed electronic work with digital rights rules is stored at the secondary player. Responsive to detecting that the secondary player has moved outside reception range of the primary player, the secondary player only allows playback of the stored electronic work according to the digital rights rules.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
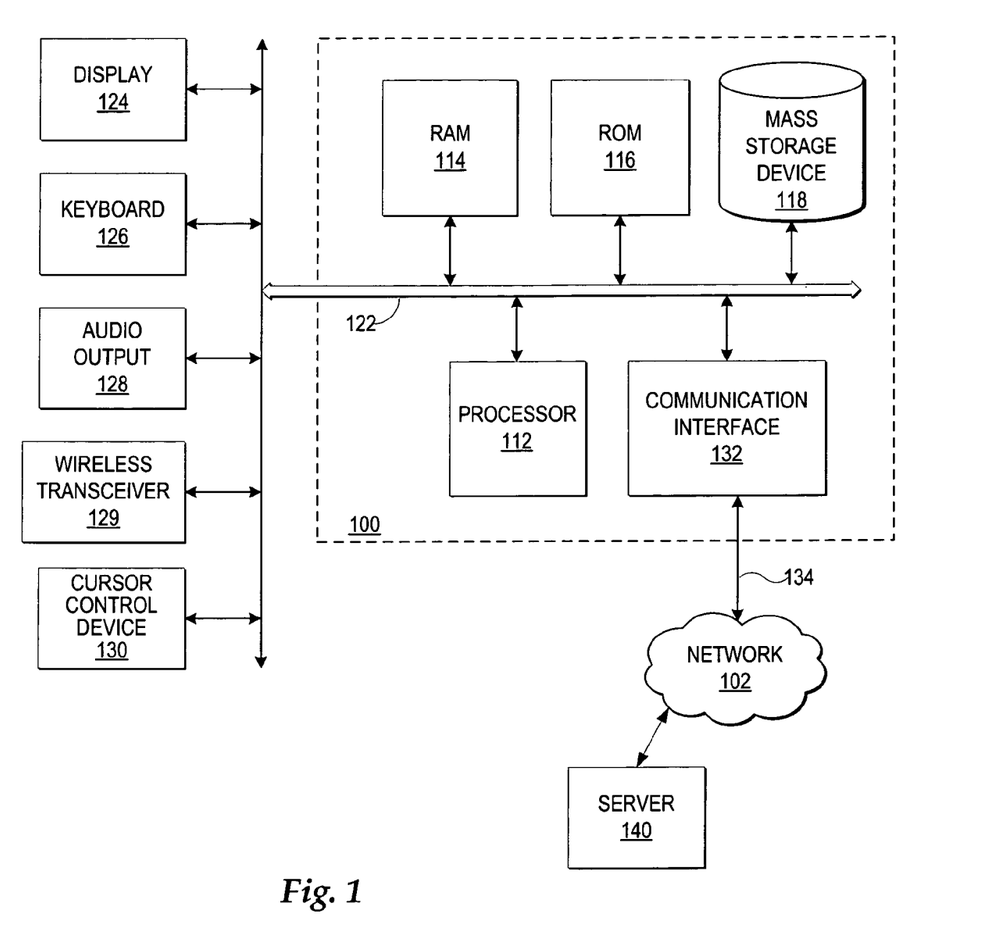
FIG. 1 is a block diagram depicting a computer system in which the present method, system, and program may be implemented.

Referring now to the drawings and in particular to FIG. 1, there is depicted one embodiment of a computer system in which the present method, system, and program may be implemented. The present invention may be executed in a variety of systems, including a variety of computing systems and electronic devices under a number of different operating systems. In general, the present invention is executed in a computer system that performs computing tasks such as manipulating data in storage that is accessible to the computer system. In addition, the computer system includes at least one output device and at least one input device.

Computer system 100 includes a bus 122 or other communication device for communicating information within computer system 100, and at least one processing device such as processor 112, coupled to bus 122 for processing information. Bus 122 preferably includes low-latency and higher latency paths that are connected by bridges and adapters and controlled within computer system 100 by multiple bus controllers. When implemented as a server system, computer system 100 typically includes multiple processors designed to improve network servicing power.

Processor 112 may be a general-purpose processor such as IBM's PowerPC™ processor that, during normal operation, processes data under the control of operating system and application software accessible from a dynamic storage device such as random access memory (RAM) 114 and a static storage device such as Read Only Memory (ROM) 116. The operating system may provide a graphical user interface (GUI) to the user. In a preferred embodiment, application software contains machine executable instructions that when executed on processor 112 carry out the operations depicted in the flowcharts of FIGS. 9, 10, 11, and others described herein. Alternatively, the steps of the present invention might be performed by specific hardware components that contain hardwired logic for performing the steps, or by any combination of programmed computer components and custom hardware components.

The present invention may be provided as a computer program product, included on a machine-readable medium having stored thereon the machine executable instructions used to program computer system 100 to perform a process according to the present invention. The term "machine-readable medium" as used herein includes any medium that participates in providing instructions to processor 112 or other components of computer system 100 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 100 can read and which is suitable for storing instructions. In the present embodiment, an example of a non-volatile medium is mass storage device 118 which as depicted is an internal component of computer system 100, but will be understood to also be provided by an external device. Volatile media include dynamic memory such as RAM 114. Transmission media include coaxial cables, copper wire or fiber optics, including the wires that comprise bus 122. Transmission media can also take the form of acoustic or light waves, such as those generated during radio frequency or infrared data communications.

Moreover, the present invention may be downloaded as a computer program product, wherein the program instructions may be transferred from a remote computer such as a server 140 to requesting computer system 100 by way of data signals embodied in a carrier wave or other propagation medium via a network link 134 (e.g. a modem or network connection) to a communications interface 132 coupled to bus 122. Communications interface 132 provides a two-way data communications coupling to network link 134 that may be connected, for example, to a local area network (LAN), wide area network (WAN), or an Internet Service Provider (ISP) that provide access to network 102. In particular, network link 134 may provide wired and/or wireless network communications to one or more networks, such as network 102.

Network 102 may refer to the worldwide collection of networks and gateways that use a particular protocol, such as Transmission Control Protocol (TCP) and Internet Protocol (IP), to communicate with one another. Network 102 uses electrical, electromagnetic, or optical signals that carry digital data streams. The signals through the various networks and the signals on network link 134 and through communication interface 132, which carry the digital data to and from computer system 100, are exemplary forms of carrier waves transporting the information.

When implemented as a server system, computer system 100 typically includes multiple communication interfaces accessible via multiple peripheral component interconnect (PCI) bus bridges connected to an input/output controller. In this manner, computer system 100 allows connections to multiple network computers.

Further, multiple peripheral components may be added to computer system 100, connected to multiple controllers, adapters, and expansion slots coupled to one of the multiple levels of bus 122. When implemented as a portable player, for example, a wireless transceiver 129 is connectively enabled on bus 122 for controlling wireless transmissions. Wireless transceiver 129 constantly listens to a pre-programmed public channel for new, remote parties and sends and receives data and messages on the public channel. Wireless transceiver 129 may be implemented by any short-range radio technology, such as, but not limited to, Bluetooth, 802.11, or Digital Enhanced Cordless Telecommunications (DECT). An audio output 128 is connectively enabled on bus 122 for controlling audio output through a speaker, headphones, or other audio projection device. A display 124 is also connectively enabled on bus 122 for providing visual, tactile or other graphical representation formats. A keyboard 126 and cursor control device 130, such as a mouse, trackball, or cursor direction keys, are connectively enabled on bus 122 as interfaces for user inputs to computer system 100. In alternate embodiments of the present invention, additional input and output peripheral components may be added.

Those of ordinary skill in the art will appreciate that the hardware depicted in FIG. 1 may vary. Furthermore, those of ordinary skill in the art will appreciate that the depicted example is not meant to imply architectural limitations with respect to the present invention.

The functionality of computer system 100 may be implemented in data processing systems from servers to portable players. Portable players may be computer systems that are tailored to efficiently receive, store and playback electronic works. Examples of portable players include, but are not limited to, MP3 players, portable DVD players, electronic book (ebook) play devices, and other devices specified for playback of a particular type of electronic work. Portable players may also be incorporated into other types of portable computer systems, such as wireless telephones and personal digital assistants.

Figure 2:
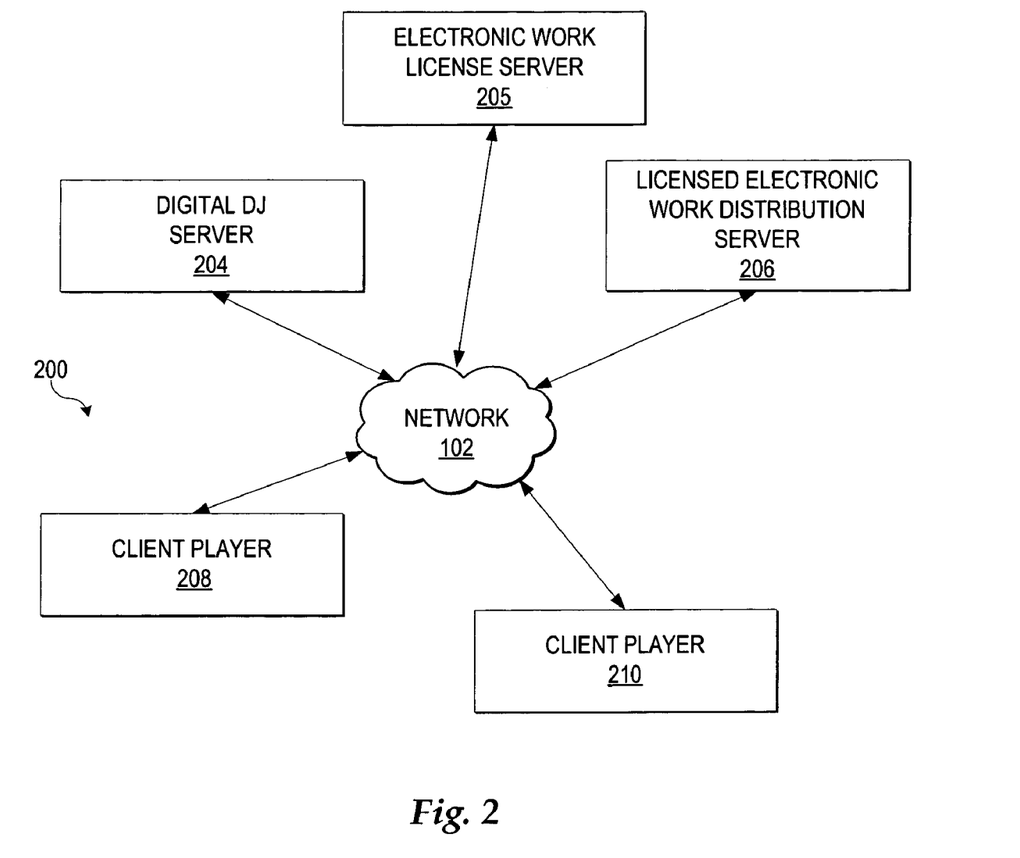
FIG. 2 is a block diagram depicting a distributed network system for facilitating an electronic work licensing and distribution system in accordance with the method, system, and program of the present invention.

With reference now to FIG. 2, a block diagram depicts a distributed network system for facilitating an electronic work licensing and distribution system in accordance with the method, system, and program of the present invention. Distributed system 200 is a network of computers in which the present invention may be implemented. Distributed system 200 contains a network 102, which is the medium used to provide communications links between various devices and computers connected together within distributed system 200. Network 102 may include permanent connections such as wire or fiber optics cables, temporary connections made through telephone connections, and wireless transmission connections.

The client/server environment of distributed system 200 includes multiple client players 208 and 210 communicatively connected to network 102. In addition, there are multiple servers, such as digital DJ server 204, electronic work license server 205, and licensed electronic work distribution server 206 communicatively connected to network 102.

The client/server environment of distributed system 200 is implemented within many network architectures. For example, the architecture of the World Wide Web (the Web) Follows a traditional client/server model environment. The terms "client" and "server" are used to refer to a computer's general role as a requester of data (the client) or provider of data (the server). In the Web environment, web browsers such as Netscape Navigator™ typically reside on client players 208 and 210 and render Web documents (pages) served by a web server, such as servers 204, 205, and 206. Additionally, each of client players 208 and 210 and servers 204, 205, and 206 may function as both a "client" and a "server" and may be implemented utilizing a computer system such as computer system 100 of FIG. 1. Further, the present invention is also implemented by client players 208 and 210 engaged in peer-to-peer network communications and downloading via network 102.

The Web may refer to the total set of interlinked hypertext documents residing on servers all around the world. Network 102, such as the Internet, provides an infrastructure for transmitting these hypertext documents between systems connected to network 102. Documents (pages) on the Web may be written in multiple languages, such as Hypertext Markup Language (HTML) or Extensible Markup Language (XML), and identified by Uniform Resource Locators (URLs) that specify the particular web page server from among servers, such as server 205, and pathname by which a file can be accessed, and then transmitted from the particular web page server to an end user utilizing a protocol such as Hypertext Transfer Protocol (HTTP) or file-transfer protocol (FTP). Web pages may further include text, graphic images, movie files, electronic books, sound files, and streaming audio, as well as Java applets and other small embedded software programs that execute when the user activates them by clicking on a link.

While network 102 is described with reference to the Internet, network 102 may also operate within an intranet or other available networks, including peer to peer networks. Furthermore, client players 208 and 210 may connect to network 102 through a data processing system acting as a port for transferring information between servers accessible through network 102 and client players 208 and 210. Additionally, client players 208 and 210 may communicate within a local wireless network. This local wireless network is typically considered "ad-hoc" because it is created when client players 208 and 210 are within wireless broadcast range of one another.

Client players 208 and 210 are preferably computer systems enabled to receive, play, and store electronic works. As described, client players 208 and 210 may be portable and enabled to receive and send wireless transmissions within a wireless network range. Alternatively, any of client players 208 and 210 may be considered stationary.

Multiple ranges of wireless transmission capability may be implemented within a single client player. For example, Bluetooth, which is a short range wireless technology and 802.11, which is a mid-range wireless technology, may be implemented within a single client player to enable multiple ranges of wireless transmissions. In particular, the DRM rules attached to an electronic work may specify the preferred reception and transmission ranges for broadcast of an electronic work and may limit the type of network available for broadcast of an electronic work. For example, DRM rules may specify that electronic works are transmittable by cable only, by Bluetooth only, or by a peer to peer network allowing a set number of concurrent connections. It is important to note that while the present invention is described with emphasis upon wirelessly broadcast electronic works, electronic works may also be broadcast via a cabled network connection from client player 208 and client player 210.

Digital DJ server 204 provides a service for selecting electronic works for play between client players 208 and 210. Digital DJ server 204 may track the previous ratings of electronic works made by users of client players 208 and 210. Then, digital DJ server 204 may determine which electronic work to next play from the electronic works that currently reside on client player 208 or 210. Alternatively, digital DJ server 204 may determine which electronic work to next play from electronic works currently residing at digital DJ server 204. The functionality of digital DJ server 204 may also reside within client players 208 and 210.

Electronic work license server 205 provides a service for tracking licenses and use of licensed electronic works. Additionally, electronic work license server 205 may provide licenses to client players 208 and 210 or adjust the licenses to the electronic works already acquired.

Licenses are preferably attached to electronic works in the form of DRM rules. These DRM rules may allow a user who has purchased an electronic work to wirelessly transmit a sample of that electronic work to other electronic devices. For example, a song purchased by the user of client player 208 may include DRM rules that allow for broadcast of the song to client player 210. Additionally, the DRM rules preferably limit the allowed usage of the sample of electronic work and are thus transmitted with the broadcast of electronic work. Where, however, DRM rules or other licensing rules are not attached to an electronic work received at client player 208 or 210, then the client player may initiate a request for licensing the electronic work with electronic work license server 205 before the electronic work can be played.

Licensed electronic work distribution server 206 preferably provides a service for selling electronic work with licenses in the form of attached DRM rules. A user may be required to register an identity or make a payment to acquire an electronic work. Where a user samples an incomplete version of an electronic work from a wireless broadcast, the DRM rules may include a link to licensed electronic work distribution server 206 to acquire a complete version of the electronic work.

Figure 3:
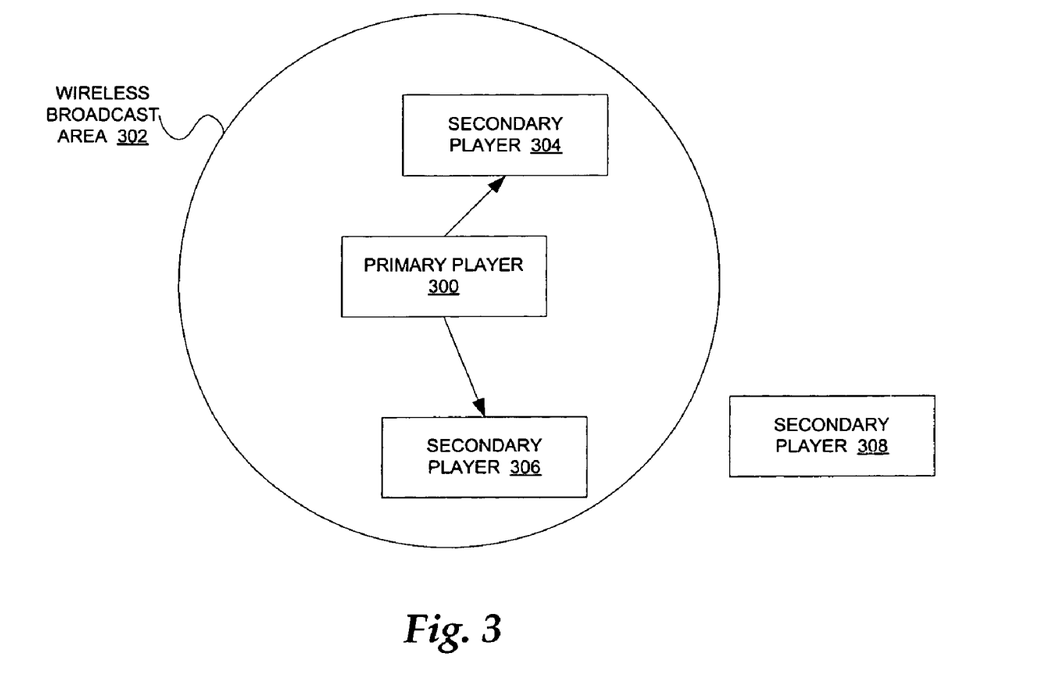
FIG. 3 is a block diagram depicting a wireless network broadcast in accordance with the method, system, and program of the present invention.

Referring now to FIG. 3, there is depicted a block diagram of a wireless network broadcast in accordance with the method, system, and program of the present invention. As illustrated, of the client players illustrated in FIG. 2, one of these players may be designated as a primary player, such as primary player 300 for the local wireless network. Players may vie for the designation as primary player by offering electronic works or one player may automatically be designated as primary player. Further, after one player receives a wireless broadcast of an electronic work, the player may move to a new broadcast area and become the primary player for that electronic work in the new broadcast area. It is important to note that while a wireless network of players is described, in an alternate embodiment, players may also be connected via a cable or a wired network connection.

In one example, primary player 300 searches for secondary players enabled to wirelessly communicate. Primary player 300 is enabled to wirelessly communicate within a range designated by wireless broadcast area 302. Once primary player 300 detects other players, such as secondary players 304 and 306, within wireless broadcast area 302, then primary player 300 establishes a local wireless network. Within the local wireless network, primary player 300 may wirelessly broadcast the electronic work being played on primary player 300 as a sample electronic work. Preferably, the DRM rules and context associated with the streamed electronic work are also broadcast. An advantage to streaming the electronic work as it is playing on primary player 300 is that synchronous play is possible on secondary players 304 and 306. However, in addition to streaming an electronic work as it plays, the entire sample electronic work may be wirelessly transmitted as a data file from primary player 300 to secondary players 304 and 306.

In an alternate example, primary player 300 is constantly broadcasting a stream within wireless broadcast area 302 of the current electronic work playing on primary player 300. When players, such as secondary players 304 and 306 are within the wireless network area, then the broadcast stream is received at the secondary players. For example, primary player 300 may be a stationary player that wirelessly broadcasts within a store or other defined area to secondary players that enter the store or other defined area. In another example, primary player 300 may be a portable player that wirelessly broadcasts from its current location, thus creating an ad-hoc local wireless network area as it moves.

The broadcast of an electronic work by primary player 300 may be controlled by the DRM rules attached to the electronic work being broadcast. In particular, the DRM rules may specify preferences or limitations for the reception and transmission ranges and the transmission mediums. Preferably, wireless and cabled feedback systems are included in primary player 300 and secondary players 304 and 306 to facilitate range detection.

The context of an electronic work broadcast by primary player 300 may be transmitted with the electronic work. The context of the electronic work generally includes the history, reviews, and distribution path of an electronic work. For example, for a musical work, the context may include, but is not limited to, a song title, artist name(s), genre, album name, album type, distributor name, distributor link, label name, label link, artist link, reviewer name, reviewer ratings, and reviewer text.

Secondary players 304 and 306 receive the streamed electronic work and may synchronously playback the electronic work. Additionally or alternatively, secondary players 304 and 306 may store a copy of the broadcast stream with the DRM rules for later playback. Once secondary players 304 and 306 move out of broadcast area 302, such as the position of secondary player 308, then only the stored copy of the broadcast stream can be played back as allowed by the DRM rules.

Prior to broadcasting an electronic work, primary player 300 may query secondary players 304 and 306 for user preferences. Primary player 300 may then determine which electronic works stored on primary player 300 should be played next based on the user preferences from secondary players 304 and 306 and the user preferences for primary player 300. Alternatively, primary player 300 may transmit all the relevant user preferences to a digital DJ via an Internet connection and request recommendations for the next broadcast from the current electronic works accessible from primary player 300 or any of the secondary players. Further, the digital DJ may recommend new electronic work and negotiate payment for the work with a licensed electronic work distribution server.

Once a user listens to or views a streamed electronic work at second player 304 or 306, the user may rate the electronic work. A rating may take multiple forms including, but not limited to, a thumbs up/down, a numeral rating, an alphanumeric rating, or other selection from a rating system implemented by the players. Additionally, a user may review the electronic work. Review comments and the identity of the reviewer may be added to the context of the electronic work and transmitted among the other players and broadcast with the electronic work.

When a player, such as any of primary player 300 or secondary players 304 and 306, establishes a network connection to the Internet or other network with servers that monitor licenses, the player may automatically report a record of any sample electronic work received at the player to an electronic work license server or other server system that monitors distribution of licenses. Further, when a player detects a network connection to the Internet or other network with servers that monitor electronic work ratings, the player may automatically report a record of the ratings assigned by users to sample electronic works received at the player to a electronic work license server or other server system that monitors ratings and comments about licensed electronic works.

Figure 4:
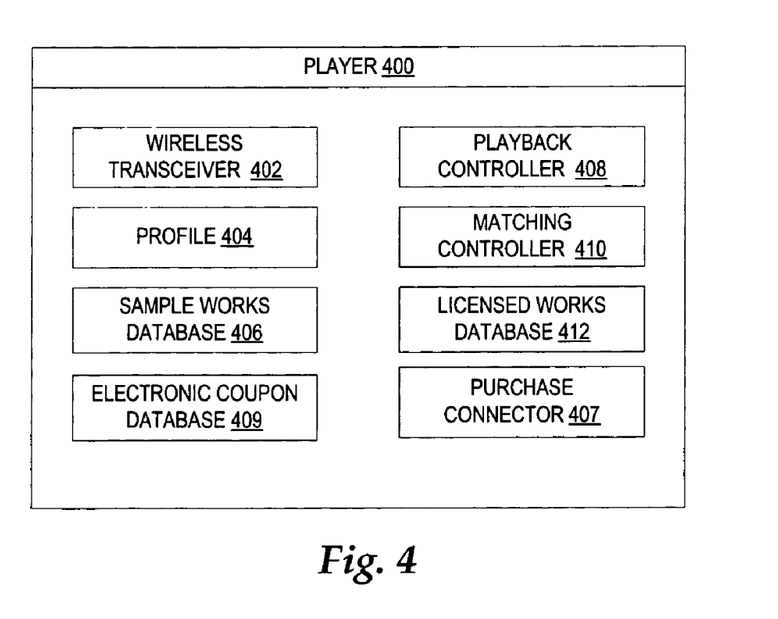
FIG. 4 is a block diagram depicting a music player in accordance with the method, system, and program of the present invention.

With reference now to FIG. 4, there is illustrated a block diagram of a music player in accordance with the method, system, and program of the present invention. As illustrated, player 400 includes an example of components that may operate within an electronic device enabled to receive, play, and store electronic works.

First, player 400 includes a wireless transceiver 402 enabled to send and receive wireless communications. Wireless transceiver 402 may implement multiple types of wireless broadcast technology including, but not limited to, Bluetooth, 802.11, and DECT.

Next, player 400 includes a playback controller 408 enabled to synchronize playback of a data stream with the other players playing the same data stream of an electronic work. As long as player 400 is within the broadcast range of the primary player, playback controller 408 may enable playback of a current data stream of an electronic work or playback of a previously stored sample electronic work received from the primary player.

Playback controller 408 also preferably condenses and stores data streams of electronic-works in a sample works database 406. Sample works database 406 includes condensed files, in formats such as MP3, from streaming electronic works with DRM rules. When player 400 is outside the broadcast range of the primary player, then the stored sample electronic works in sample works database 406 may be played back, but only according to DRM rules for each electronic work. Further, playback controller 408 may prohibit playback of any sample electronic work acquired without any licensing rights.

Playback controller 408 also controls playback of electronic works downloaded onto player 400 with a license for use and potentially also for broadcast to other players. In particular, electronic works may be downloaded that include a license to transfer the electronic work file or broadcast the electronic work to other players as a sample electronic work with DRM rules limiting playback of the sample work.

According to one advantage of the present invention, when player 400 detects a wireless broadcast, player 400 may compare the context of the electronic work being broadcast with profile 400 and decide whether the user would prefer to automatically store the broadcast or ignore the broadcast. In particular, player 400 may also detect multiple electronic works being broadcast at the same time. A user may select to listen to one of them; playback controller 408 may filter the others according to profile 400 and store those for which the user may have interest.

When electronic works are streamed from one player to another, electronic coupons may also be broadcast. Electronic coupons received at player 400 are stored in electronic coupon database 409. Electronic coupons may include discounts, rebates, and other incentives for a recipient of a broadcast electronic work to purchase the electronic work or purchase additional licensing rights to the electronic work from an electronic work license server or a licensed electronic work distribution server.

A profile 404 stored on player 400 preferably records the electronic work preferences for a user. Profile 404 may include, but is not limited to, a listing of the current electronic works stored on player 400 and ratings assigned by the user to each of the electronic works stored on player 400. Additionally, profile 404 may include, but is not limited to, a listing of electronic works previously listened to or viewed by the user and the rating assigned by the user to each. Further, profile 404 may include, but is not limited to, a listing of styles of music, film, books, musicians, actors, years of recording, and other categories of preferences for a user. Moreover, profile 404 may include, but is not limited to, a listing of types of music, film, artists, actors, songs, and years of recording that a user would like to listen to or view in the future.

Player 400 can transfer the data in profile 404 to other players within a local wireless network. Further, player 400 may receive profiles from other players within a local wireless network. A matching controller 410 within player 400 compares the profiles of other users within the local wireless network with the context of the electronic works available for broadcast in licensed works database 412 and selects music for broadcast to the other players that best satisfies the preferences of all the listeners. If the preferences of some users cannot be matched with the preferences of other users, then matching controller 410 may alternate selections between those that will satisfy the preferences of a first group of users and then those that will satisfy the preferences of a second group of users. Alternatively, if a preference match cannot be made to the current electronic works, then player 400 may seek to acquire new electronic works that will match preferences.

A purchase connector 407 preferably initiates access to the electronic work license server or the licensed electronic work distribution server to acquire additional licensing and to register stored samples of electronic works from broadcasts. Purchase connector 407 may initiate a connection with the electronic work license server or licensed electronic work distribution server via an Internet or other network connection.

Figure 5:
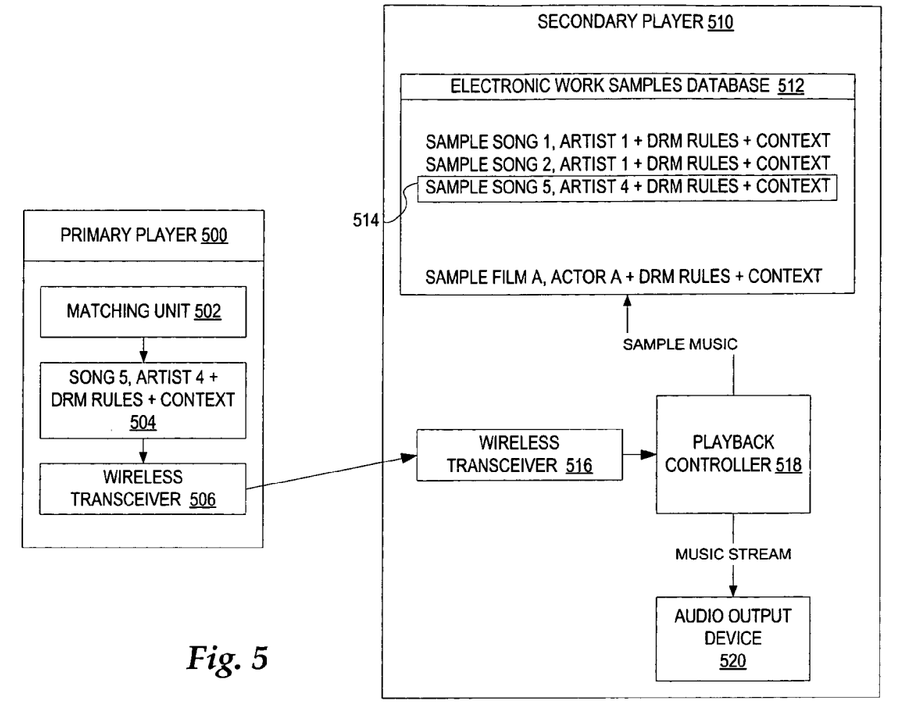
FIG. 5 is a block diagram depicting the wireless communication between a primary player broadcasting music and the secondary player receiving music in accordance with the method, system, and program of the present invention.

Referring now to FIG. 5, there is depicted a block diagram of the wireless communication between a primary player broadcasting music and the secondary player receiving music in accordance with the method, system, and program of the present invention. As illustrated, a primary player 500 includes a matching unit 502 that selects song 5 from artist 4 with DRM rules and context, as depicted at reference numeral 504. When matching unit 502 selects an electronic work, the context data for an electronic work and DRM rules are matched with a selection of user preferences from the user of the primary player and the users of any accessible secondary players. Context data for an electronic work may include, but is not limited to, song title, artist name(s), genre, album name, album type (e.g. original LP or compilation), reviewer name, reviewer ratings, and reviewer text. DRM rules may include, for example, whether the electronic work is free or is ruled by a limited license.

In this embodiment, the musical work is streamed through wireless transceiver 506 and received at wireless transceiver 516 of secondary player 510. Secondary player 510 includes a playback controller 518 that synchronizes playback of the music stream with primary player 500 and controls output of the stream through audio output device 520. The music stream is also stored as sample music by music playback controller 518 in an electronic work samples database 512. As illustrated at reference numeral 514, the sample of song 5, artist 4 with DRM rules and context is stored in music samples database 512. While the present invention is described where DRM rules and context are transmitted in a wireless broadcast of a work, in an alternate embodiment, only portions of each of an electronic work, context, and DRM rules may be transmitted during a wireless broadcast.

Figure 6:
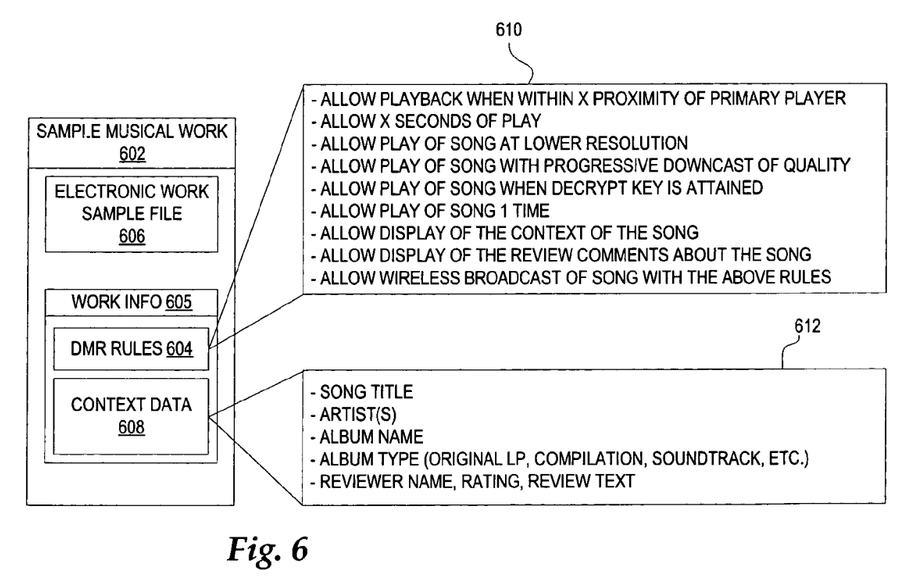
FIG. 6 is a block diagram depicting a sample song stored in a music player in accordance with the method, system, and program of the present invention.

With reference now to FIG. 6, there is depicted a block diagram of a sample musical work stored in a secondary player in accordance with the method, system, and program of the present invention. As illustrated, the storage of an electronic work, here song 5 from artist 4, may include work info 605 and a music stream file 606.

Work info 605 includes DRM rules 604 and context data 608. DRM rules 604 preferably control play of the electronic work and output of the context of the electronic work. Context data 608 preferably includes historical context, distribution context, and review context for the electronic work.

In the examples of DRM rules 604 depicted at reference numeral 610, playback of a song stored at a player may be allowed when the player is within a certain transmission range of the primary player. Proximity to the primary player may be measured by the signal strength detected from the primary player.

In another example of DRM rules 604, the song stored at a player may be played back, but only a certain number of seconds of the song or a lower resolution or downcast in quality may be allowed. Further, in another example, the entire song may be stored, but the digital rules may require a decrypt key to be accessed from a licensing database before the song can be played. In particular, rather than storing the music stream, the music file may be transferred and stored where the decrypt key is required for later play. Further, DRM rules may allow playback of the entire song.

In addition to playback of the song, the DRM rules may restrict what portions of context data 608 can be viewed where the context includes, but is not limited to, song title, album title, composer, writer, singer, producer, label, year of recording, genre, album type (e.g. original LP or compilation), reviewer name, reviewer ratings, reviewer text, reviewer recommendation depth, as illustrated at reference numeral 612. Additionally, the DRM rules may restrict what review comments the user can view about the song. Review comments may be included in the streamed transmission from multiple music reviewers or from other users who have rated the song. DRM rules 604 may require that the review comments play prior to, during, or after the electronic work.

Advantageously, each user receiving an electronic work may update context data 608 with ratings and review comments. Further, when a user specifies ratings and review comments to update context data 608, the user may further specify DRM rules for play or display of the rating and review comments.

Preferably, a playback controller within a player restricts play of music or other electronic works and display of context on the player according to the DRM rules. Alternatively, music playback controller in a music player may require acquisition of DRM rules for sample music from a licensing server prior to playing the musical work.

Figure 7:
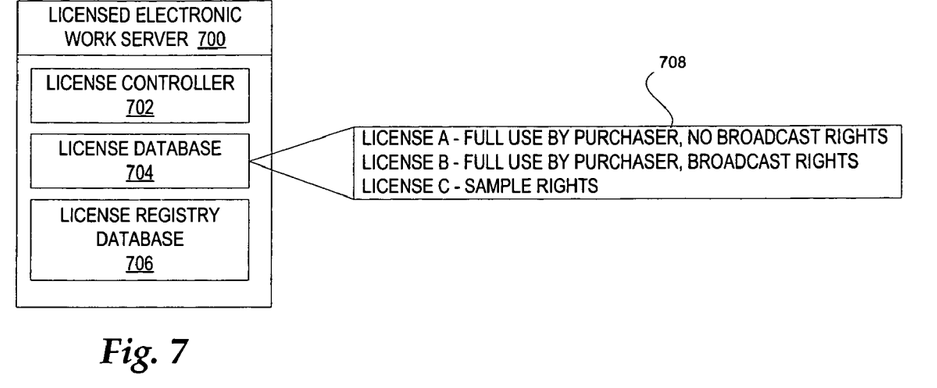
FIG. 7 is a block diagram depicting the components of a licensed electronic works server in accordance with the method, system, and program of the present invention.

With reference now to FIG. 7, there is illustrated a block diagram of the components of a licensed electronic works server in accordance with the method, system, and program of the present invention. As illustrated, an electronic work license server 700 includes a license controller 702. License controller 702 receives requests to acquire licenses for music. Further, license controller 702 may receive requests to verify a music license from players receiving broadcast electronic works. Preferably, a license database 704 stores licenses for electronic works and a license registry database 706 stores user identifiers for those who acquire music licenses. In particular, if the user meets the requirements of the license, such as paying a fee or registering, then a license for the electronic work may be transferred. In an alternate embodiment, electronic work license server 700 controls licenses for all types of electronic works.

As illustrated at reference numeral 708, multiple types of licenses may be implemented with restrictions on use. The actual restrictions are preferably defined by DRM rules. When a user purchases or registers an electronic work, the user may be provided with a list of available types of licenses, such as the types listed at reference numeral 708. Different costs may be associated with different types of licenses. Furthermore, it will be understood that in addition to the example types of licenses available, other types of licensing agreements may be available and licensing agreements may be tailored for a particular user.

Figure 8A:
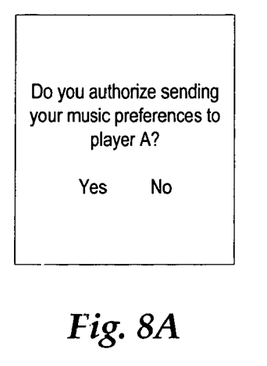
FIGS. 8A-8F are illustrative representations of display choices presented to a user of a player enabled to receive, store, and broadcast electronic works in accordance with the method, system, and program of the present invention.

Referring now to FIGS. 8A-8F, there are depicted illustrative representations of display choices presented to a user of a player enabled to receive, store, and broadcast electronic works in accordance with the method, system, and program of the present invention. As illustrated in FIG. 8A, responsive to a player detecting a query from a primary player for music preferences, the user is prompted to authorize transmitting preferences to the primary player. In particular, in this request, the user is prompted to authorize transmission of music preferences. In alternate embodiments, the user may be required to also authorize transmission of an identity and other information beyond the user's music preferences before access to a broadcast electronic work is allowed.

Figure 8B:
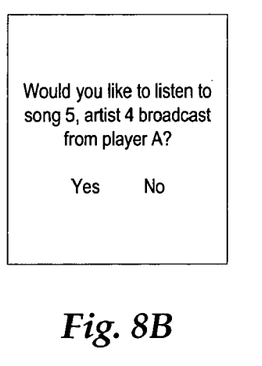

As depicted in FIG. 8B, the user also receives prompts to select whether to listen to or view a particular electronic work broadcast by another player. In particular, the user is prompted to select whether to listen to a particular song. In alternate embodiments, the user may be prompted to select whether to listen to electronic works of a particular type, from a particular artist, from a particular label, and from other specifiable categories.

Figure 8C:
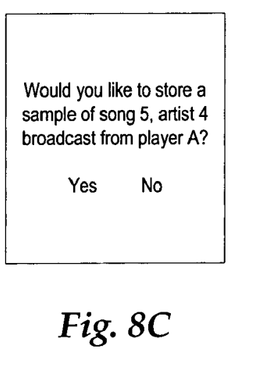

As illustrated in FIG. 8C, the user is prompted to select whether to store a sample of the electronic work received from a primary player. If the user chooses to store a sample of the electronic work, then the broadcast electronic work is stored in a default or specified format with DRM rules if available. The user may also choose to store only a portion of the sample of the electronic work or may set a preference to automatically store any broadcast electronic works received at the player.

Figure 8D:
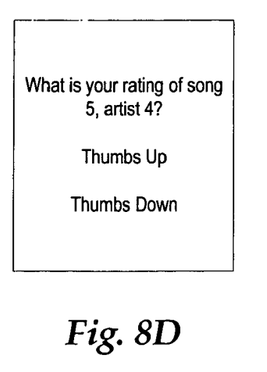

As illustrated in FIG. 8D, the user is prompted to rate the electronic work. The user may also be prompted to rate overall the selection of works received from a particular primary player. Further, the user may be prompted to rate particular characteristics of a work. The prompting may be displayed while a user is listening to a synchronous playback of a current broadcast or when the user is listening to playback of a stored sample from a broadcast. The rating scale presented to the user may be specified by the DRM rules, specified by the user, or arbitrarily selected.

Figure 8E:
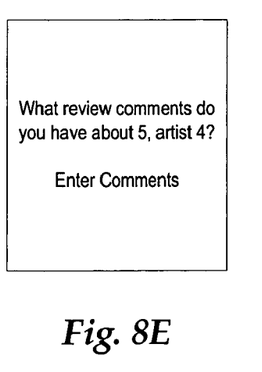

As illustrated in FIG. 8E, a user is prompted to provide review comments about the electronic work. The user may be prompted to select from several comment phrases or may enter original comments. Further, the user may be prompted to provide review comments about a particular characteristic of a work. A user may provide both textual, graphical, and audio based comments.

Figure 8F:
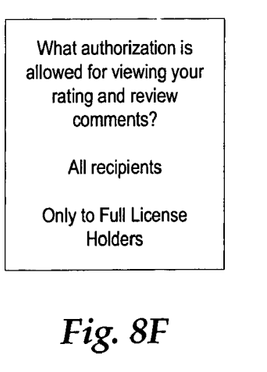

As illustrated in FIG. 8F, a user is prompted to authorize viewing or listening to the user's rating and review comments about the electronic work. For example, the user may authorize viewing of the rating and review comments to either all recipients of the electronic work or only to license holders of the electronic work. Preferably, the authorization selection made by the user is added to the DRM rules to control the viewing of context for the electronic work.

Figure 9:
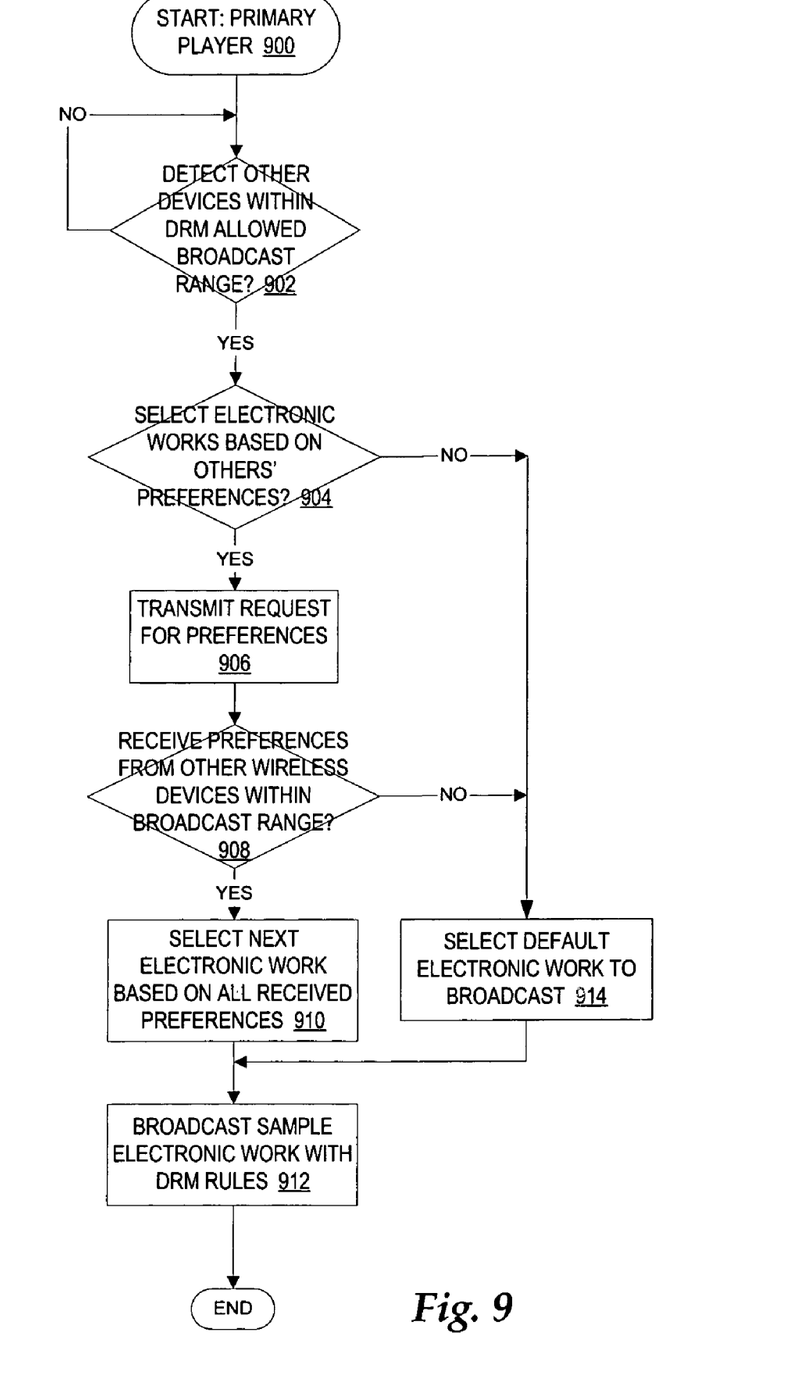
FIG. 9 is a high level logic flowchart of a process and program for controlling a primary player.

Referring now to FIG. 9, there is depicted a high level logic flowchart of a process and program for controlling a primary player. As illustrated, the process starts at block 900 and thereafter proceeds to block 902. Block 902 illustrates a determination whether other devices within the DRM allowed broadcast range are detected. In particular, a DRM rule for broadcast of a particular electronic work preferably specifies the connection types, broadcast ranges, and other broadcast limitations and preferences. If other devices are not detected, then the process iterates at block 902. If other devices are detected, then the process passes to block 904.

Block 904 depicts a determination whether the setting to select electronic works based on others' preferences is selected. The DRM rules may require a selection of electronic works based on preferences. Alternatively, a user at a primary player may require a selection of electronic works based on preferences. If the selection based on preferences is not required, then the process passes to block 914. Block 914 depicts selecting a default electronic work to broadcast. Alternatively, at block 904, if the selection based on preferences is required, then the process passes to block 906. Block 906 illustrates transmitting a request for preferences to the other wireless devices and the process passes to block 908. In particular, the request for preferences may specify which type of preferences are requested based on DRM rules or a user specification.

Block 908 depicts a determination whether preferences from other wireless devices within broadcast range are received. If no preferences are received, then the process passes to block 914. If preferences are received, then the process passes to block 910. Block 910 depicts selecting the next electronic work to broadcast based on all the received preferences. In particular, the process may also require that the electronic work include DRM rules that allow for wireless broadcasting. Further, the primary player may offload the electronic work selection process to a digital DJ located in another electronic device accessible via a network. Moreover, the playback controller may further filter the preferences received to only select the next electronic work for broadcast based on a selection of the preferences. Next, block 912 depicts broadcasting the sample electronic work with DRM rules, and the process ends.

Figure 10:
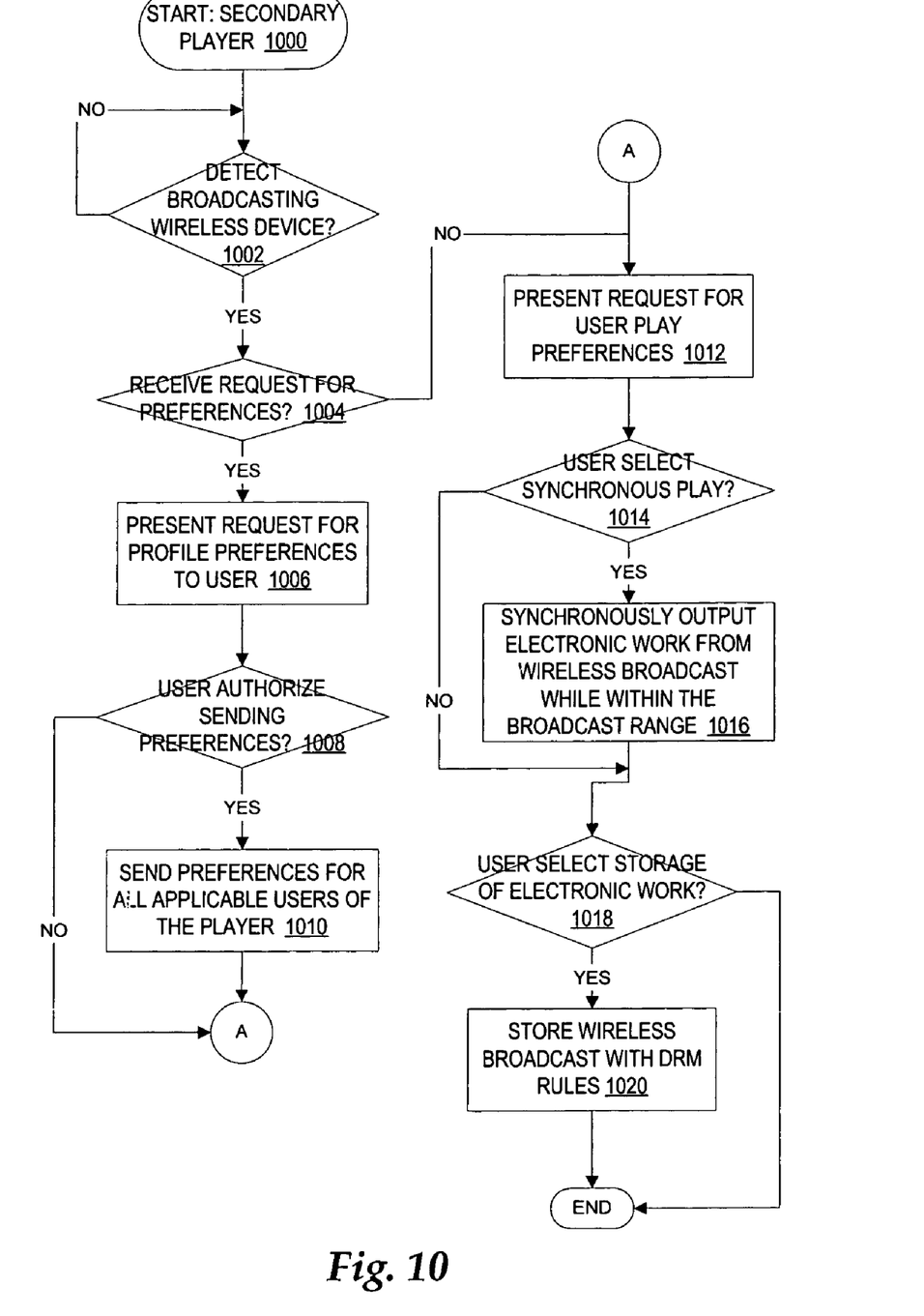
FIG. 10 is a high level logic flowchart of a process and program for controlling receipt of broadcast electronic works at a secondary player.

With reference now to FIG. 10, there is depicted a high level logic flowchart of a process and program for controlling receipt of broadcast electronic works at a secondary player. As illustrated, the process starts at block 1000 and thereafter proceeds to block 1002. Block 1002 illustrates a determination whether a broadcasting wireless device is detected. If a broadcasting wireless device is not detected, then the process iterates at block 1002. If a broadcasting wireless device is detected, then the process passes to block 1004. Block 1004 illustrates a determination whether a request for preferences is received. If a request for preferences is received, then the process passes to block 1006. If a request for preferences is not received, then the process passes to block 1012.

If the process passes to block 1006, a request is presented for the user to authorize sending profile preferences. Next, block 1008 depicts a determination whether the user authorizes sending profile preferences. If the user does not authorize sending preferences, then the process passes to block 1012. If the user does authorize sending preferences, then the process passes to block 1010. Block 1010 illustrates sending preferences for all applicable users of the player, and the process passes to block 1012. Profile preferences may be set by the device owner, the current user, or a group of users.

When the process passes to block 1012, then a request is presented for the user to select play preferences of a streaming broadcast received at the player. Next, block 1014 depicts a determination whether the user has selected synchronous play. If the user does not select synchronous play, then the process passes to block 1018. If the user selects to synchronously play the electronic work, then the process passes to block 1016. Block 1016 illustrates controlling synchronous output of the electronic work from the wireless broadcast while within the broadcast range, and the process passes to block 1018. Block 1018 depicts a determination whether the user selects to store the electronic work. If the user does not select storage of the electronic work, then the process ends. If the user selects to store the electronic work, then the process passes to block 1020. Block 1020 illustrates storing the wireless broadcast with DRM rules, and the process ends.

Figure 11:
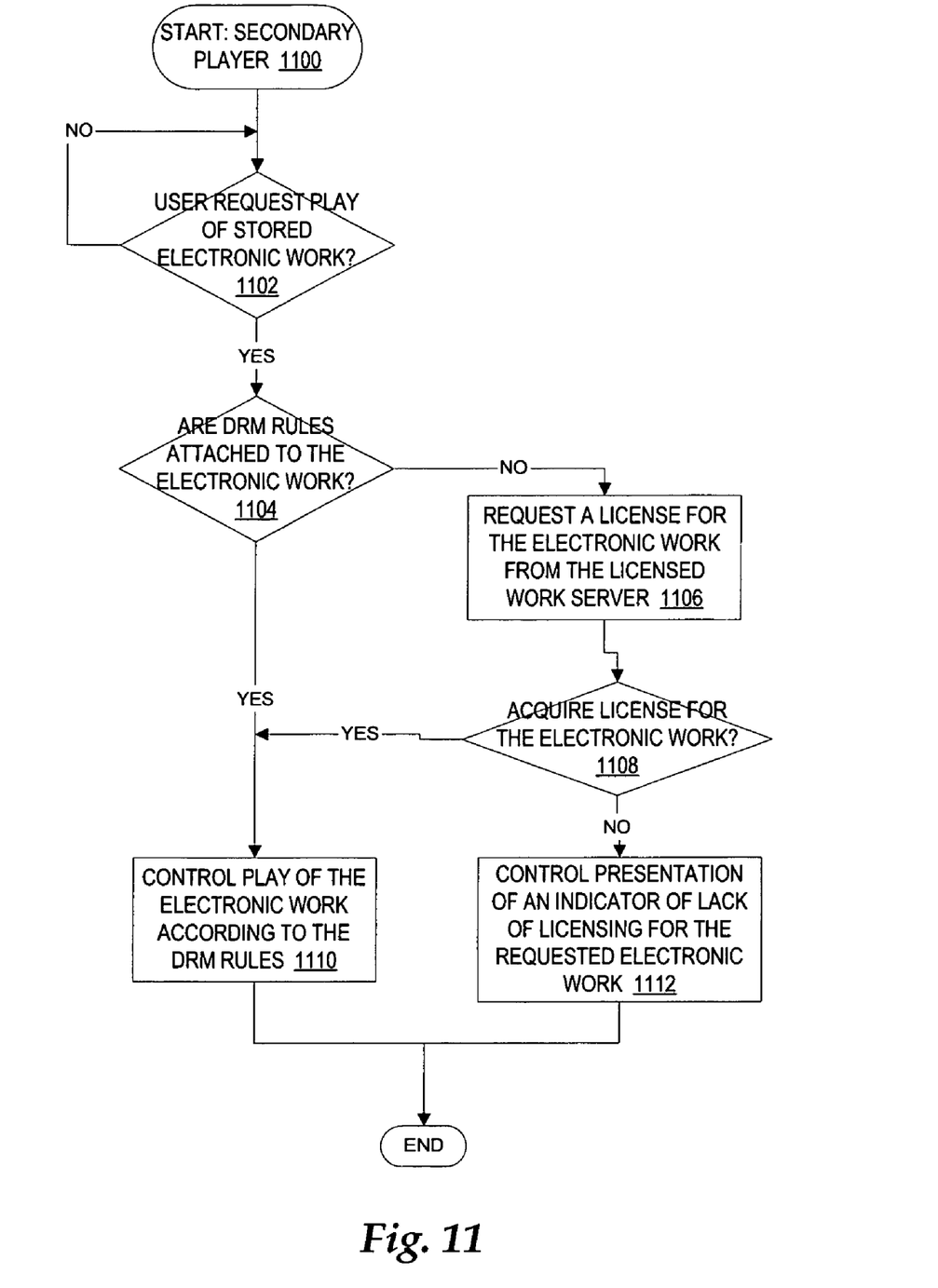
FIG. 11 is a high level logic flowchart of a process and program for controlling playback of stored samples of broadcast electronic works at a player.

Referring now to FIG. 11, there is illustrated a high level logic flowchart of a process and program for controlling playback of stored samples of broadcast electronic works at a player. As depicted, the process starts at block 1100 and thereafter proceeds to block 1102. Block 1102 depicts a determination whether a user request for play of stored electronic work is detected. If a user request for play of a stored electronic work is not detected, then the process iterates at block 1102. If a user request for play of a stored electronic work is detected, then the process passes to block 1104. Block 1104 illustrates a determination whether there are DRM rules attached to the electronic work. If there are DRM rules attached, then the process passes to block 1110. Block 1110 depicts controlling play of the electronic work according to the DRM rules and the process ends. Alternatively, at block 1104, if there are no DRM rules attached to the electronic work, then the process passes to block 1106. Block 1106 depicts requesting a license for the electronic work from a licensed work server. Next, block 1108 illustrates a determination whether a license for the electronic work is negotiated. If the license is not negotiated, then the process passes to block 1112 where an indicator of the lack of licensing is presented, and the process ends. Otherwise, if the license is negotiated, then the process passes to block 1110 and proceeds as previously described.

While the invention has been particularly shown and described with reference to a preferred embodiment, it will be understood by those skilled in the art that various changes in form and detail may be made therein without departing from the spirit and scope of the invention.

What is claimed is:

1. A method for controlling access to wirelessly broadcast electronic works during playback, comprising:

receiving a wireless broadcast of an electronic work with digital rights rules from a primary player at a secondary player, wherein said secondary player is a portable player moving into a wireless broadcast range of said primary player;

prompting a user at said secondary player to select at least one from among a synchronous playback of said electronic work and storage of a sample of said electronic work;

responsive to a selection by said user for said storage of said sample of said electronic work, storing said sample of said electronic work with digital rights rules at said secondary player; and responsive to detecting said secondary player outside reception range of said primary player, only allowing playback of stored electronic work according to said digital rights rules.

2. The method according to claim 1 for controlling access to wirelessly broadcast electronic works during playback, further comprising:
enabling synchronous play of said electronic work at said secondary player while said secondary player is within reception range of said primary player.

3. The method according to claim 1 for controlling access to wirelessly broadcast electronic works during playback, further comprising:
wirelessly transmitting electronic work preferences of at least one user of said secondary player to said primary player, such that said broadcast electronic work is selected based on said electronic work preferences.

4. The method according to claim 1 for controlling access to wirelessly broadcast electronic works during playback, further comprising:
recording a rating by at least one user of said secondary player, responsive to playback of said electronic work.

5. The method according to claim 1 for controlling access to wirelessly broadcast electronic works during playback, further comprising:
receiving said broadcast of said electronic work, wherein said digital rights rules allow broadcast of said electronic work by said primary player.

6. The method according to claim 1 for controlling access to wirelessly broadcast electronic works during playback, further comprising:
storing said broadcast of said electronic work with said digital rights rules at said secondary player, wherein said digital rights rules allow for broadcast of said electronic work by said secondary player.

7. The method according to claim 1 for controlling access to wirelessly broadcast electronic works during playback wherein said electronic work is one from among a musical work, a textual work, a video work, and a film work.

8. The method according to claim 1 for controlling access to wirelessly broadcast electronic works during playback wherein said digital rights rules are one from among a license to wirelessly broadcast said electronic work, a license to playback said sample of said electronic work a particular number of times, a license to playback only a portion of said sample of said electronic work, a license to playback said sample of said electronic work under a degraded quality, a license to playback said sample of said electronic work after a decryption key is obtained, a license to display context about said electronic work, and a license to display reviews of said electronic work.

9. The method according to claim 1 for controlling access to wirelessly broadcast electronic works during playback further comprising:
receiving a context for said electronic work during said wireless broadcast of said electronic work; and
only enabling presentation of said context via an output interface of said secondary player according to said digital rights rules for said electronic work.

10. The method according to claim 1 for controlling access to wirelessly broadcast electronic works during playback further comprising:
receiving said wireless broadcast of an electronic work with context data from a primary player at a secondary player; and
only allowing output of said context data according to said digital rights rules.

11. A method for controlling access to wirelessly broadcast electronic works during playback, comprising:
receiving a wireless broadcast of an electronic work with digital rights rules from a primary player at a secondary player, wherein said digital rights rules are one from among a license to wirelessly broadcast said electronic work, a license to playback a sample of said electronic work a particular number of times, a license to playback only a portion of said sample of said electronic work, a license to playback said sample of said electronic work under a degraded quality, a license to playback said sample of said electronic work after a decryption key is obtained, a license to display context about said electronic work, and a license to display reviews of said electronic work;
storing said sample of said electronic work with said digital rights rules at said secondary player; and
responsive to detecting said secondary player outside reception range of said primary player, only allowing playback of stored electronic work according to said digital rights rules.

* * * * *

UNITED STATES PATENT AND TRADEMARK OFFICE
CERTIFICATE OF CORRECTION

PATENT NO. : 7,620,362 B2 Page 1 of 1
APPLICATION NO. : 10/728163
DATED : November 17, 2009
INVENTOR(S) : Brown et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1552 days.

Signed and Sealed this

Twenty-sixth Day of October, 2010

David J. Kappos
*Director of the United States Patent and Trademark Office*